US008743178B2

(12) United States Patent
Filippini et al.

(10) Patent No.: US 8,743,178 B2
(45) Date of Patent: Jun. 3, 2014

(54) MULTI-VIEW VIDEO FORMAT CONTROL

(75) Inventors: Gianluca Filippini, Los Gatos, CA (US); Reinhard Steffens, Santa Clara, CA (US); James Dougherty, Morgan Hill, CA (US); Thomas Zato, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 554 days.

(21) Appl. No.: 12/984,593

(22) Filed: Jan. 4, 2011
(Under 37 CFR 1.47)

(65) Prior Publication Data
US 2011/0216162 A1 Sep. 8, 2011

Related U.S. Application Data

(60) Provisional application No. 61/292,426, filed on Jan. 5, 2010.

(51) Int. Cl.
*H04N 13/00* (2006.01)

(52) U.S. Cl.
CPC ....... *H04N 13/0029* (2013.01); *H04N 13/0055* (2013.01); *H04N 13/0062* (2013.01); *H04N 13/0048* (2013.01); *H04N 13/0059* (2013.01)
USPC ................. 348/43; 348/42; 348/51; 348/441; 382/154

(58) Field of Classification Search
CPC ................. H04N 13/0048; H04N 19/00769; H04N 13/0059; H04N 13/0055; H04N 13/0438; H04N 13/004; H04N 13/0062; H04N 2013/0081; H04N 13/0037; H04N 13/0029; H04N 7/0122; H04N 13/0066; H04N 13/007; H04N 13/0456; H04N 2201/0065; H04N 2213/003; H04N 2213/005; G09G 2340/0407; G09G 2340/0492
USPC ........... 348/51, 42, 384.1, 43, 441, 445, 469, 348/556; 375/240.16, 240.24, 240; 382/232, 154; 711/173; 707/802; 709/219; 715/201
See application file for complete search history.

(56) References Cited

U.S. PATENT DOCUMENTS 7,054,478 B2 *  5/2006  Harman ................. 382/154
7,319,720 B2     1/2008  Abrams
(Continued)

FOREIGN PATENT DOCUMENTS

WO     2007047736     3/2007
WO     2007069189     6/2007
(Continued)

OTHER PUBLICATIONS

Bruls, et al., "Enabling Introduction of Stereoscopic (3D) Video: Compression Standards & its Impact on Display Rendering". Consumer Electronics, 2007. ICCE 2007. Digest of Technical Papers. International Conference, Publication Date: Jan. 10-14, 2007, No. of pp. 1-2, Current Version Published: Apr. 10, 2007.

(Continued)

*Primary Examiner* — Sath V Perungavoor
*Assistant Examiner* — Nathnael Aynalem

(57) ABSTRACT

Techniques for multi-view video format control are provided. In some embodiments, a display video format supported by a display panel is determined. A video format code is extracted from a coded bitstream in which a plurality of images is encoded in two or more source video formats. The video format code identifies a source video format in which a set of images in the plurality of images is encoded. A video format filter is selected to modify the set of images encoded in the source video format to generate another set of images encoded in the display video format. The other set of images encoded in the display video format is sent to the display panel.

20 Claims, 9 Drawing Sheets

(56) References Cited

U.S. PATENT DOCUMENTS

| | | | |
|---|---|---|---|
| 7,650,036 B2* | 1/2010 | Lei et al. | 382/232 |
| 2002/0047914 A1* | 4/2002 | Rosengren et al. | 348/384.1 |
| 2005/0047501 A1* | 3/2005 | Yoshida et al. | 375/240 |
| 2005/0259147 A1 | 11/2005 | Nam | |
| 2006/0067580 A1* | 3/2006 | Lee et al. | 382/232 |
| 2006/0221178 A1* | 10/2006 | Yun et al. | 348/42 |
| 2006/0269226 A1* | 11/2006 | Ito et al. | 386/95 |
| 2007/0076798 A1* | 4/2007 | Imahashi et al. | 375/240.24 |
| 2007/0247477 A1 | 10/2007 | Lowry | |
| 2008/0019661 A1 | 1/2008 | Obrador | |
| 2008/0252719 A1 | 10/2008 | Choi | |
| 2008/0275905 A1* | 11/2008 | Hannuksela | 707/102 |
| 2008/0276158 A1* | 11/2008 | Lim et al. | 715/201 |
| 2008/0309755 A1 | 12/2008 | Yoshida | |
| 2009/0060043 A1* | 3/2009 | Nuyttens | 375/240.16 |
| 2009/0066783 A1 | 3/2009 | Lee | |
| 2009/0066785 A1* | 3/2009 | Lee | 348/51 |
| 2009/0089535 A1* | 4/2009 | Lohmar et al. | 711/173 |
| 2009/0092311 A1 | 4/2009 | Kim | |
| 2009/0092335 A1 | 4/2009 | Kim | |
| 2009/0096863 A1 | 4/2009 | Kim | |
| 2009/0096864 A1 | 4/2009 | Hwang | |
| 2009/0122134 A1 | 5/2009 | Joung | |
| 2013/0212222 A1* | 8/2013 | Outlaw | 709/219 |

FOREIGN PATENT DOCUMENTS

| | | |
|---|---|---|
| WO | 2008156318 | 12/2008 |
| WO | 2009048216 | 4/2009 |

OTHER PUBLICATIONS

Fehn, et al., "An Advanced 3DTV Concept Providing Interoperability and Scalibility for a Wide range of Multi-Baseline Geometries", Published in Image Processing, 2006 IEEE International Conference on Oct. 8-11, 2006 on pp. 2961-2964 in Atlanta, GA, current version published: Feb. 20, 2007.

Jung, et al., "2D/3D Mixed Service in T-DMB System Using Depth Image Based Rendering", International Conference on Advanced Communication Technology, ICACT, v 3 p. 1868-1871. Publisher: Institute of Electrical and Electronics Engineers, Inc.

* cited by examiner determine a display video format supported by a display panel 410 extract a video format code from a coded bitstream in which a plurality of images is encoded in two or more source video formats 420 select a video format filter to modify the set of images encoded in the source video format to generate a new set of images encoded in the display video format 430 send the new set of images encoded in the display video format to the display panel 440

FIG. 4

MULTI-VIEW VIDEO FORMAT CONTROL

CROSS REFERENCE TO RELATED APPLICATIONS

This application claims priority to U.S. Provisional Patent Application No. 61/292,426 filed 5 Jan. 2010, hereby incorporated by reference in its entirety.

TECHNOLOGY

The present invention relates generally to display systems, and in particular, to display systems that display 3-dimensional (3D) images.

BACKGROUND

In general, a human eye perceives objects in 3D based on the slight difference in a right eye view and a left eye view. The illusion of depth can be created for a 2-dimensional (2D) image such as in a photograph or movie by providing one view of the image to one eye and a slightly different view of the image to the second eye.

Many 3D display techniques provide differing views of an image to left and right eyes. One or more techniques for providing differing views of an image require receiving images encoded for that technique. For example, a technique for a 3D display may require a side-by-side image input. However, if an image that has not been encoded for 3D mode is provided as input for a 3D display, the image may not be properly displayed. For example, if a line of text that has not been encoded for a 3D display mode is provided as input for a 3D display, the text appears distorted to a viewer viewing the text using the 3D display.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4 illustrates an example process flow, according to a possible embodiment of the present invention.

DESCRIPTION OF EXAMPLE POSSIBLE EMBODIMENTS

Figure 1A:
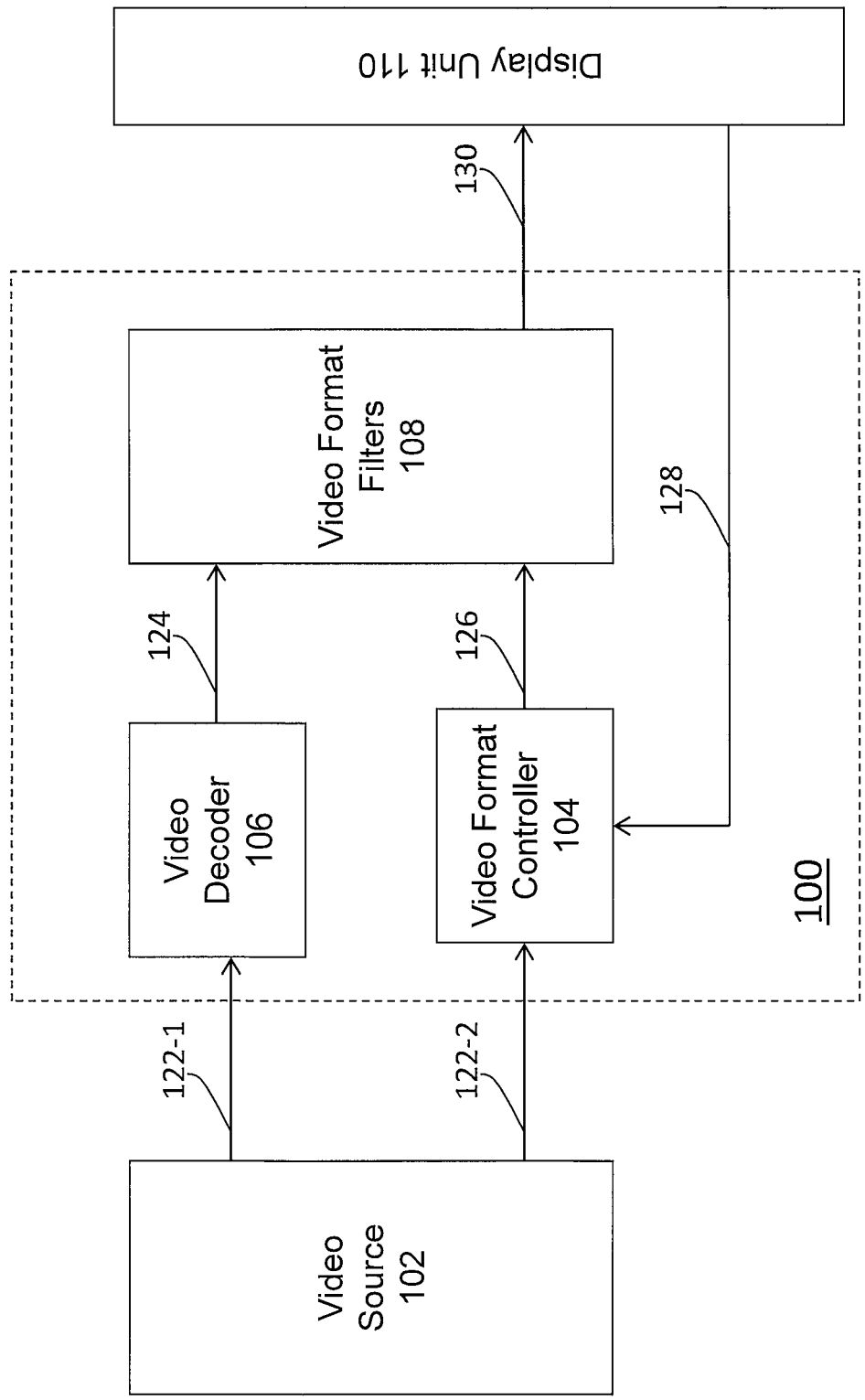
FIG. 1A, FIG. 1B, FIG. 1C, FIG. 1D and FIG. 1E illustrate example systems and components that support multi-view video formats, according to possible embodiments of the present invention.

Example possible embodiments, which relate to multi-view video format control, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline:

1. General Overview
2. Example Multi-View Display System
3. Example Video Source
4. Example Video Format Controller
5. Graphics Effects
6. Other Example Multi-View Display Systems
7. Example Sequence of Filtering
8. Example Filtering Operations
9. Example Process Flow
10. Implementation Mechanisms—Hardware Overview
11. Equivalents, Extensions, Alternatives and Miscellaneous 1. General Overview This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

In some embodiments, a display video format supported by a display panel is automatically determined. The display video format may relate to a 3D video display mode of the display panel, or may relate to a 2D video display mode of the display panel, or may relate to any other video display mode that the display panel supports. A video format code is extracted from a coded bitstream provided to a multi-view display system. The coded bitstream comprises image data which may be decoded into a plurality of source video images. The plurality of source video images may be encoded in two or more source video formats. The video format code extracted from the coded bitstream identifies a particular source video format in which a set of images in the plurality of images is encoded. Examples of the set of images may include, but are not limited to, 3D images that contain depth information, or 2D images. Based on the video format code extracted from the coded bitstream, a video format filter may be selected to modify the set of images encoded in the particular source video format to generate another set of images encoded in the display video format automatically determined for the display panel. The other set of images encoded in the display video format may be sent to the display panel. In this manner, a special signaling method to automatically adapt images in a source video format to the (final) display video format during an audio/video playback is provided.

In an embodiment, the video format code may be indicated in a metadata channel in the coded bitstream. The metadata channel may be outside one or more media data channels that comprise the image data for the plurality of source video images. In some embodiments, the coded bitstream may be logically formatted as a container file that comprises one or more channels that encode the plurality of images and a separate channel that comprises the video format code. In an example, the coded bitstream may be a Moving Picture Experts Group 4 Part 14 (MP4) file; the video format code may be embedded in one or more MP4 metadata tracks that are separate from tracks that encode the plurality of images. In another example, the coded bitstream may be a Moving Picture Experts Groups 2 transport stream (MP2TS); the video format code may be embedded in one or more tracks that comprise packet identifiers (PIDs) and that are separate from one or more media data tracks that encode the plurality of images. In yet another example, the coded bitstream may be a H.264 video elementary stream; the video format code may be embedded in one or more Supplemental Enhancement Information (SEI) messages. Other examples of audio video containers may be used in embodiments of this invention.

In some embodiments, in addition to the video format code, a format change timestamp corresponding to a video format code may also be embedded in the coded bitstream with the video format code and may also be extracted from the coded bitstream. The format change timestamp may specify a time at which the set of images, as indicated (or signaled) by the corresponding video format code, starts. Alternatively and/or optionally, a frame ID corresponding to the video format code may be embedded in the coded stream to identify in a frame-accurate manner which frame is the first frame in the set of source video images encoded in the particular source video format as signaled by the video format code. In some embodiments, only a video format code is provided to the multi-view display system to signal an immediate start of a new source video format.

In some embodiments, mechanisms as described herein form a part of a multi-view display system, including but not limited to a television, a laptop computer, netbook computer, cellular radiotelephone, electronic book reader, point of sale terminal, desktop computer, computer workstation, computer kiosk, and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Example Multi-View Display System

Images may be described herein with reference to one or more example media, including still images, video frames, slide shows, etc. The selection of an example medium in this description may be made for simplicity and concise unity and, unless expressly stated to the contrary, should not be construed as limiting an embodiment to a particular medium as embodiments of the present invention are well suited to function with any media content.

FIG. 1A shows an example of a multi-view display system (100) in accordance with one or more possible embodiments. In an embodiment, the multi-view display system (100) generally represents a single device or multiple devices that are configured to render images on a display unit (110) based on image data provided by a video source (102). In an embodiment, as illustrated in FIG. 1A, the multi-view display system (100) may comprise a video decoder (106), a video format controller (104), and video format filters (108).

In an embodiment, the display unit (110) corresponds to any device with a display panel configured to receive and display images. The display unit (110) may include a cathode ray tube, a liquid crystal display, a plasma display, or any other suitable display.

The image data may be embedded in a coded bitstream representing a file on a media disc, from a media server, or other suitable providers of media files. The image data may also be a coded bitstream transmitted by a media transponder that receives media data wirelessly or with a wired connection. The coded bitstream may logically be structured as a container that comprises one or more image data channels and one or more metadata channels outside the image data channels. One or more of the image data channels may comprise compressed or uncompressed data that can be decoded into a plurality of source video images (124). One or more of the metadata channels in the coded bitstream may comprise video format codes.

The plurality of source video images (124) may comprise multiple sets of source video images each set being encoded in a different source video format. In an example, a first set of source video images in the plurality of source video images (124) generally represents any content (e.g., still image, video frame of a set of video frames, a slide from a slide show, a web page, web content, an interface, a desktop application view, a web based application view, an electronic programming guide, on screen display, etc.) in a first source video format, which may or may not be properly viewed in a display mode that the display unit (110) is configured for. For example, the first set of source video images may be a single image in a side-by-side format (which is an example of the source video formats in which the plurality of source video images (124) may be encoded) made up of two side-by-side sub images, where the first sub image and the second sub image are similar. The first set of source video images may also be in an alternative source video format comprising an alternating sequence of images, where the alternating images are intended for presentation to each eye via shuttered glasses for example, alternatively, by a display unit, if the display unit is configured in a display mode to do so.

A second set of source video images in the plurality of source video images (124) generally represents any content (e.g., still image, video frame of a set of video frames, a slide from a slide show, a web page, web content, an interface, a desktop application view, a web based application view, an electronic programming guide, on screen display, etc.) in a second source video format, which may or may not be properly viewed in the display mode that the multi-view display system (100) is configured for. In an example, viewing the second set of source video images on the multi-view display system (100) may result in a distorted view of the image if the left half and the right half of the second set of source video images are altogether different. For example, the display unit (100) in a side by side 3D display mode may display a first half of the second set of source video images to the left eye and a second half of the second set of source video images to right eye, resulting in an unintended visual effect of layering the first half of the second set of source video images over the second half of the second set of source video images.

Although two sets of source video images are described for this example case, any number of sets of source video images in any number of source video formats may be provided to the multi-view display system (100) for concurrent or sequential display.

In an embodiment, the display unit (110) may provide display mode information (128) to the video format controller (104) in the multi-view display system (100). The video format controller is not related to a specific 3d pixel displacement method used by the display unit (110). The video format controller also supports different resolutions adopted by image data in the coded stream. The video format controller further supports different resolutions supported by the display unit (110). The video format controller (104) may automatically obtain the display mode information from the display unit (110) on demand, by polling at one or more times, by notification, or using any other suitable mechanism. In an embodiment, a user may manually input and override some or all of the display mode information from the display unit (110). The display mode information (128) obtained by the video format controller may generally represent any data associated with the current display mode of the display unit (110). The display mode information (128) may indicate a display mode for 3D. The display mode information (128) may indicate that the left half of an image received by the display unit (110) is to be used for display to a left eye and that a right half of the image is to be used for display to a right eye.

Alternatively and/or optionally, the display mode information (128) may indicate that alternate frames are to be displayed to the left eye and the right eye. Alternatively and/or optionally, the display mode information (128) may indicate that the top half of an image is to be displayed to the left eye and the bottom half of an image is to be displayed to the right eye. Alternatively and/or optionally, the display mode information (128) may indicate that the display unit (110) is currently in a 2D display mode.

Additionally and/or optionally, the display mode information (128) received by the display format controller (104) may indicate capabilities of the display unit (110) to be in any of a plurality of display modes, which the display unit (110) may support. For example, the display mode information (128) obtained by the video format controller (104) may indicate that the display unit (110) may presently concurrently support more than one display video format. In these embodiments, the video format controller (104) may cause source video images received in the coded bitstream to be transformed into new images in any of the display video formats presently supported by the display unit (110) in order for these new images to be properly displayed.

The display mode information (128) obtained by the video format controller (104) may correspond to information received by the display unit (110) through an input mechanism. For example, the display unit (110) may receive a wired or wireless user signal carrying remote control instructions from a user of the display unit (110). The user signal configures the display unit (110) in a particular display mode. The display mode information (128) may be persistently stored on the display unit (110). Thus, even if the display unit (110) is powered off, the display mode information (128) may not be lost.

As noted above, the display mode information (128) may also correspond to information provided by a user to the video format controller (104) through an input mechanism. For example, the user may manually configure the video format controller (104) with display mode information (128) that matches with the display unit (110).

In an embodiment, the video format controller (104) generally represents any hardware and/or software configured to extract a video format code from the coded bitstream. In an example, the video format controller (104) may receive the coded bitstream in the entirety as an input from the video source (102). In another example, the video format controller (104) may receive a part of the coded bitstream as an input from the video source (102). For example, the part of the coded bitstream may be a part that comprises one or more metadata channels in the coded bitstream that are configured to comprise video format codes. The video format code may, but is not limited to, be in a part of the coded bitstream that is outside one or more media data channels that comprise image data for the plurality of source video images (124). In some embodiments, the video format controller (104) may receive the input (122-2) from the video source (102).

In some embodiments, the multi-view display system (100) may include components located on the same device (e.g., a server, mainframe, desktop PC, laptop, PDA, television, cable box, satellite box, kiosk, telephone, mobile phone, etc.) or may be located on separate devices communicatively coupled over a network (e.g., Internet, Intranet, Extranet, Local Area Network (LAN), Wide Area Network (WAN), etc.), with wire and/or wireless segments. In one or more embodiments, the multi-view display system (100) is implemented using a client-server topology. The multi-view display system (100) itself may be an enterprise application running on one or more servers, and in some embodiments could be a peer-to-peer system, or resident upon a single computing system. In addition, the multi-view display system (100) may be accessible from other machines using one or more interfaces, web portals, or any other tool. In one or more embodiments, the multi-view display system (100) is accessible over a network connection, such as the Internet, by one or more users. Information and/or services provided by the multi-view display system (100) may also be stored and accessed over the network connection.

In an embodiment, the video decoder (106) generally represents any hardware and/or software configured for receiving the coded bitstream in the entirety or a part of the coded bitstream comprising the media data channels comprising the image data for the plurality of source video images. Additionally and/or optionally, the video decoder (106) may perform some, or all, of the following functionality: sharpening, de-noising, de-banding, de-blocking, etc. The video decoder (106) may be configured to decode the image data from the coded bitstream and generate a plurality of source video images in two or more source video formats. For example, one or more of the media data channels may comprises first media data for stereoscopic images such as those of a 3D movie. In an example, the video decoder (106) may decode the first media data into the first set of source video images in the first source video format, as described above. In another example, the video decoder (106) may decode the media data into the first set of source video images in an alternative source video format, as described above, or another 3D video format. Additionally and/or optionally, one or more of the media data channels may comprise second media data for 2D images such as those of an advertisement video. For example, the video decoder (106) may decode the second media data into the second set of source video images in the second source video format, as described above, or another 2D video format. Thus, based on the image data in the coded bitstream, the video decoder (106) may generate the plurality of source video images. This plurality of source video images may simply be referred to as "a plurality of images." Different video formats in which the plurality of source video images may be encoded are referred herein as "source video formats."

As illustrated, the video decoder (102) may provide the plurality of source video images (124) as an input to the video format filters (108). In an embodiment, the video format filters (108) generally represents any hardware and/or software configured for modifying an image in a video format to obtain a new image in a different video format which may be suitable for rendering on the display unit (110) in a display mode as indicated by the display mode information (128). For example, the display unit (110) may be set in a 3D display mode. The video format filters (108) may modify an image in the plurality of source video images (124) which image may be in the second set of source video images and may not be encoded in a video format for the 3D display mode (as indicated in the display mode information (128)), to obtain a new image encoded in a video format for the 3D display mode. Video format filtering may be applied to all source video images which video format codes indicate an incompatible source format with the display video format of the display unit (110) to generate a plurality of converted images. These converted images may be encoded in a video format and can be properly rendered on the display unit (110). As used herein, a video format that the display unit (110) supports is referred to as a "display video format," as previously discussed.

For example, in view of any expected 3D displaying technique as indicated by the display mode information (128), the video format filters (108) may modify an original image such that the resulting visualization of the modified image through the multi-view display system (100) will be appropriate. The video format filters (108) may include functionality to re-order pixels in an image, remove pixels from an image, add pixels to an image, and/or combine pixels from different images. The video format filters (108) may include other functionality to provide the modified images as an input (130) to the display unit (110).

3. Example Video Source

Figure 1B:
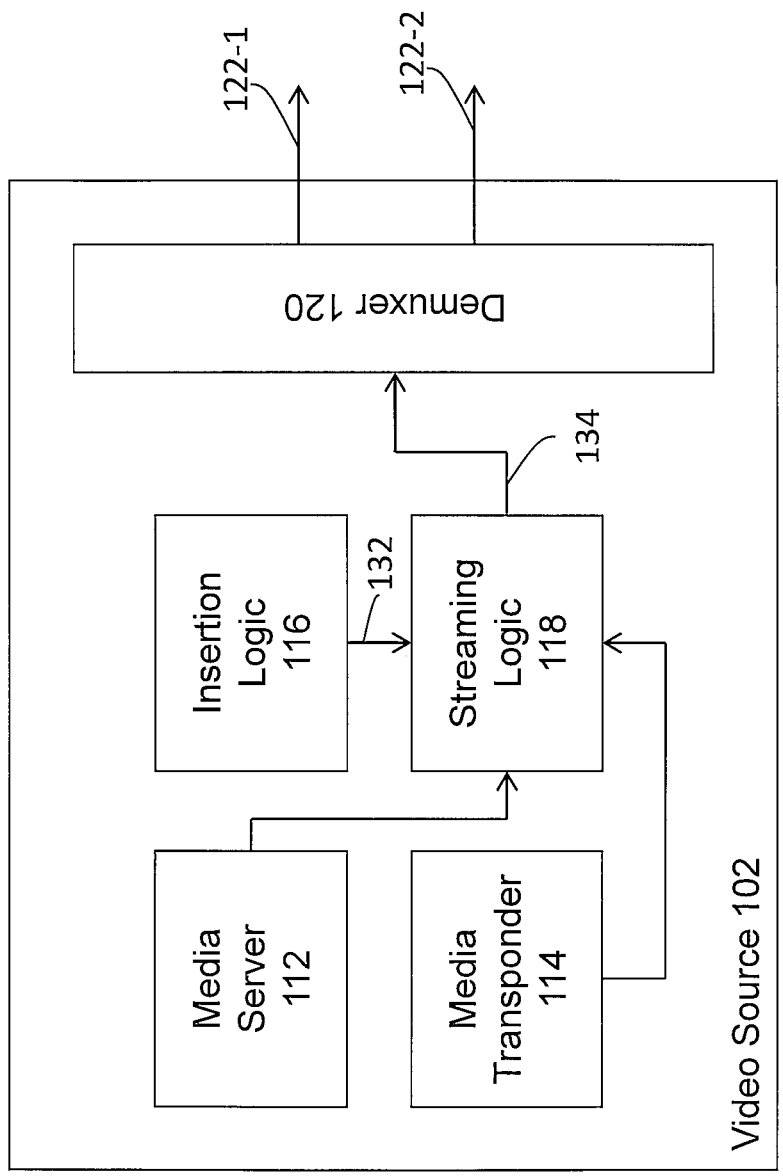

FIG. 1B illustrates an example video source (e.g., 102), in accordance with embodiments of the invention. In various embodiments, any of the components illustrated in FIG. 1B may be in a separate device from other components depicted in the figure. In an example, the video source (102) may comprise a media server (112), which may or may not be networked. The media server (112) may provide media data—for example, from locally stored media files on a disc or from remote locations over a network connection—as an input to streaming logic (118). In another example, the video source (102) may comprise a media transponder (114). The media transponder (114) is a device, or a part of a device, that may receive input from satellite, cable, a carrier network, a wireless network, a router, a proxy, etc., and transmit output to the streaming logic (118).

In an embodiment, the video source (102) may comprise insertion logic (116). The insertion logic (116) may provide video format codes (132) as an input to the streaming logic (118). Each of the video format codes (132) may be used to identify a source video format. Additionally and/or optionally, the insertion logic (116) may provide format change timestamps in the input to the streaming logic (118). Each of the format change timestamps may correspond to a different one of the video format codes and may be used to specify when a particular source video format, as indicated by a corresponding video format code, starts.

In an embodiment, the streaming logic (118) may receive video format codes (132) and/or format change timestamps and/or other metadata from a component, other than or in addition to the insertion logic (116). For example, any or all of metadata as described herein may be received from media server (112) or the media transponder (114), or any other devices or components that are configured to provide the metadata. More than one component may be used to provide some or all of the metadata including video format codes and/or format change timestamps as described herein.

In some embodiments, the streaming logic (118) may combine media data and metadata as described herein into a coded bitstream (134) as described herein. The coded bitstream (134) may be sent to a demuxer (120). The demuxer (120) may duplicate the coded bitstream (134) and forward copies of the coded bitstream (134) in multiple output data flows. The demuxer (120) also may de-multiplex the coded bitstream (134) into different channels and direct different channels to different recipients. For example, image data for a plurality of source video images in one or more media data channels in the coded bitstream (134) may be sent to the video decoder (106) in a first data flow (122-1). Video format codes and timestamps in one or more metadata channels in the coded bitstream (134) may be sent to the video format controller (104) in a second data flow (122-2).

4. Example Video Format Controller

Figure 1C:
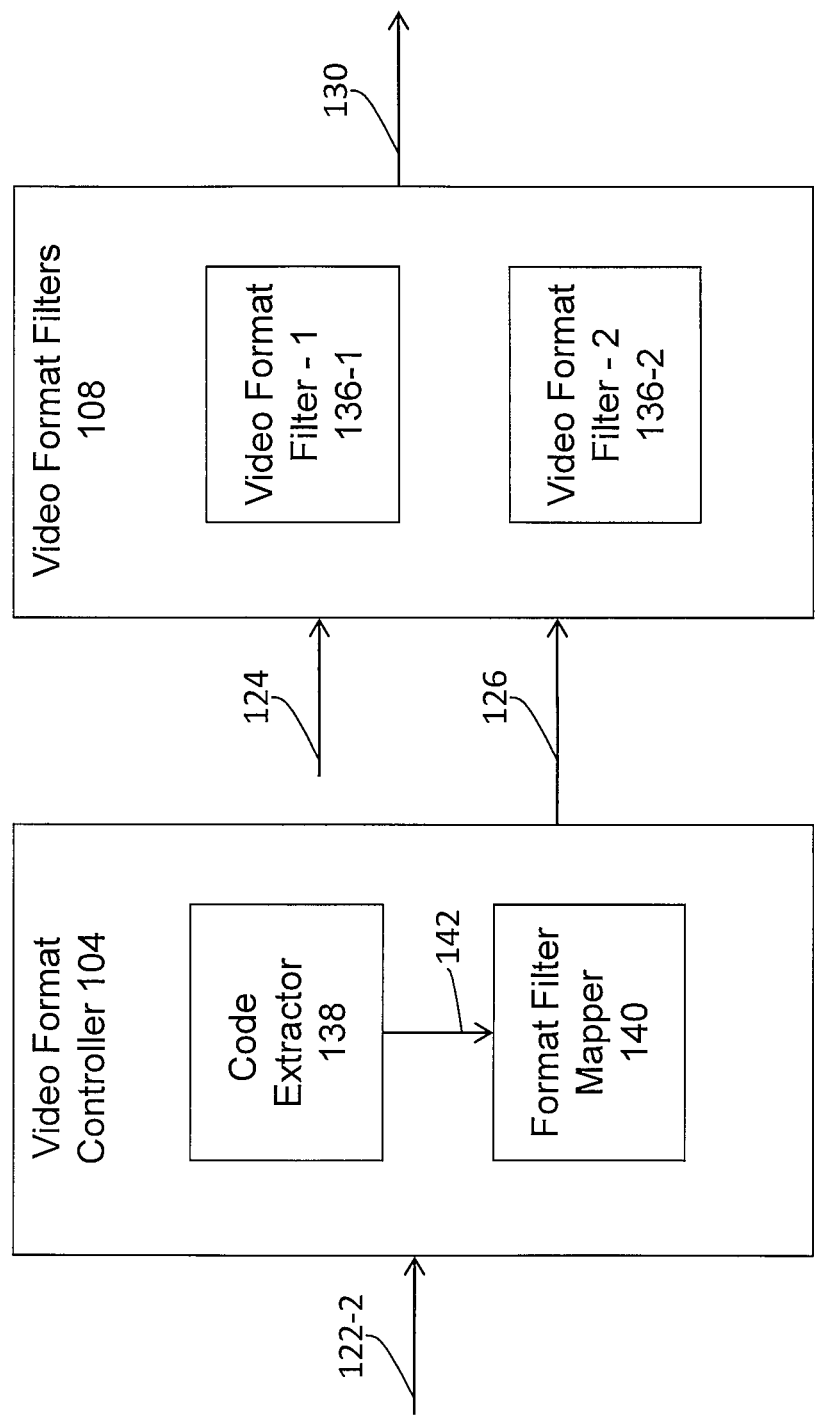

FIG. 1C illustrates an example video format controller (e.g., 104) and video format filters (e.g., 108). Source video images and converted images as described herein may be formatted in a plurality of video formats. These video formats may be different combinations of formats, resolutions, frame rates, graphics effects (GFX), physical displays (2D/3D), etc. These video formats may include, but are not limited to: 2D, frame sequential, dual-channel VGA modulo-angulo, stereo side-by-side (SBS)-LR, stereo SBS-RL, stereo ASBS-LR, stereo over/under, row- or line-interleaved, checkerboard, etc. In some embodiments, the multi-view display system (100) may comprise one, two, or more video decoders. In an embodiment, one or more video decoders may be associated with a corresponding video format filter in the video format filters (108) configured to convert an image generated by that video decoder into a new image encoded in a display video format of the display unit (110). In some embodiments, one or more layers of scalable video coding/multi-view coding (SVC/MVC) may be associated with a corresponding video format filter in the video format filters (108) configured to convert an image in one video format to the display video format of the display unit (110). In some embodiments, one or more of graphics effects (GFX) layers (SVC/MVC) may be associated with a corresponding video format filter in the video format filters (108) configured to convert an image in one video format to the display video format of the display unit (110).

The video format filters (108) may be used to modify an image in one video format to generate a converted image in a different video format. In various embodiments, a video format filter may be used to perform some, or all, of the following functionality: scaling, frame rate conversion, pixel re-alignment for 2D/3D display, chroma conversion and chroma filtering, subsampling, upsampling, etc. The video format filters (108) may additionally and/or optionally include a null filter (or simply a bypass) that does not change an image from one video format to a different video format. This null filter may be used when, for example, a source video image as provided by the video decoder (106) is already in a display video format that is currently supported by the display unit (110).

As illustrated in FIG. 1C, the video format filters may comprise two or more different video format filters such as video format filter-1 (136-1) and video format filter-2 (136-2). The video format filters may comprise two or more inputs. A first input may be the plurality of source video images (124) from the video decoder (106). A second input to the video format filters may be a control signal (126) from the video format controller (104). The control signal (126) may be sent by the video format controller (104) when the controller determines that a particular video format filter in the video format filters (108) should be used to modify one or more images in the plurality of source video images (124). The control signal (126) may also be used to instruct the video format filters (108) to apply the null filter as described above to a set of source video images that require no modification.

In an embodiment, the video format controller (104) may receive the data flow (122-2) comprising metadata, which includes one or more video format codes as described herein. As noted, additionally and/or optionally, the video format controller may receive other information that may be used to identify a specific time or a specific image (frame) at which a new source video format is used in the plurality of images as received by the video format filters (108). For example, a format change timestamp as described herein may be used to specify a time at which the new source video format may be used. Alternatively and/or additionally, a frame identifier may be used to identify a starting source video image at which the new source video format starts.

In an embodiment, the video format controller (104) may comprise a code extractor (138) implemented in software, hardware, or a combination of software and hardware. The code extractor is configured to extract the video format codes and other corresponding metadata from the second data flow (122-2).

In an embodiment, the video format controller (104) may comprise a format filter mapper (140) implemented in software, hardware, or a combination of software and hardware. In some embodiments, the video format controller (104) or the format filter mapper (140) therein may be configured to access a lookup table. This lookup table may be local to the format filter mapper (140) or may be downloaded remotely, or may be accessed over a network connection; and may be used to map a video format code to a particular video format as a source video format to be used either immediately or at a given point as indicated by other extracted metadata from the second dataflow (122-2) received by the video format controller (104). Thus, the video format controller (104) may determine that a particular video format filter needs to be used. Accordingly, the video format controller (104) may send a control signal (126) as described herein to the video format filters (108).

5. Graphics Effects

Figure 1D:
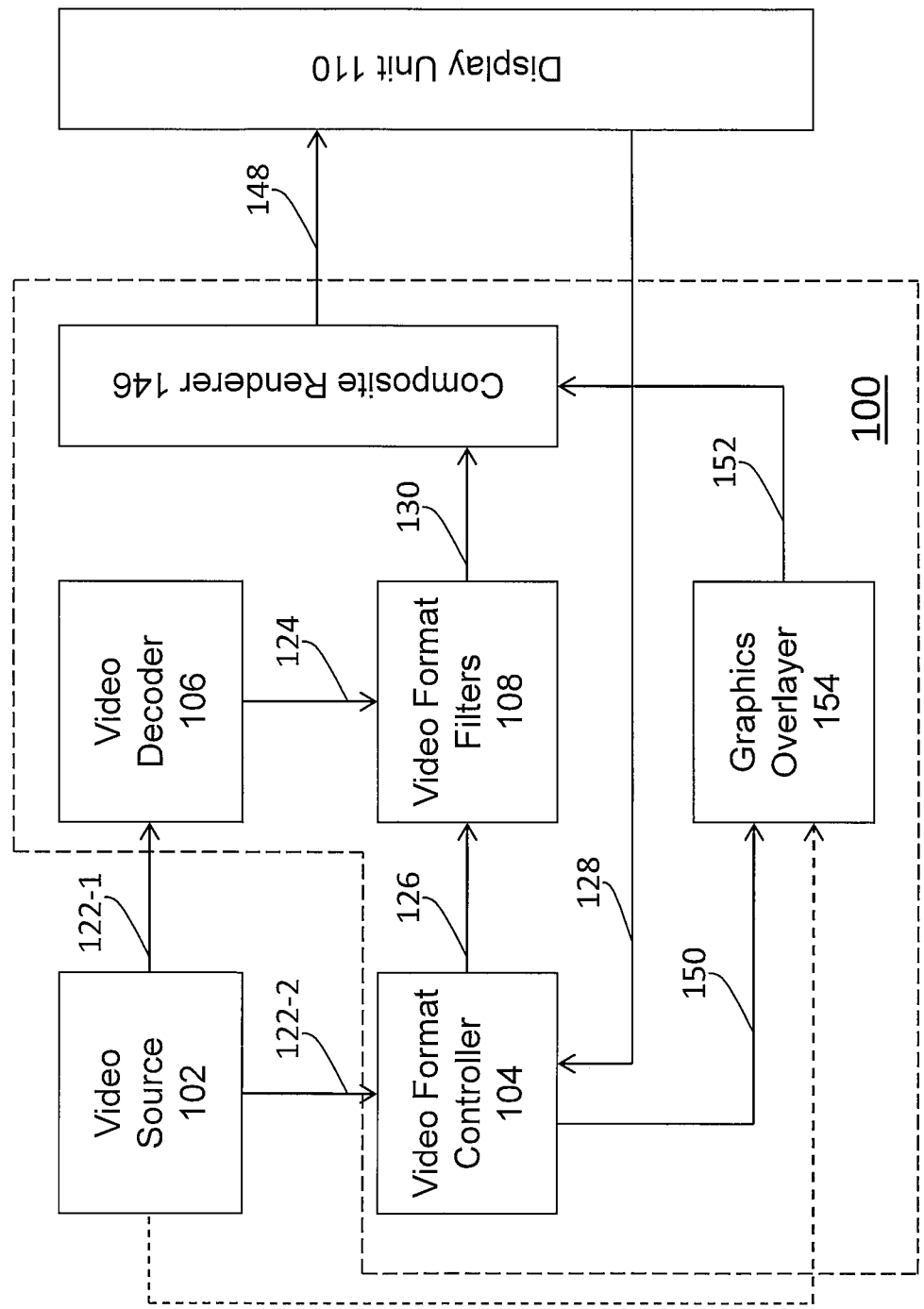

FIG. 1D illustrates an example multi-view display system (e.g., 100) for overlaying graphics effects onto images, according to embodiments of the invention. The multi-view display system (100) comprises a graphics overlayer (154). In an embodiment, the graphics overlayer (154) generally represents any hardware and/or software configured for creating graphic effects image data. The graphics overlayer (154) may obtain graphics effects data for graphics effects from the same video source (102) that provides the plurality of source video images. Alternatively and/or optionally, the graphics overlayer (154) may obtain the graphics effects data for graphics effects from a different video source (not shown), or may automatically generate the graphics data based on other information accessible to the graphics overlayer (154).

In an embodiment, the video format controller (104) may determine, based on video format codes and/or other extracted metadata from the coded bitstream, that a particular type of graphics effects should be produced in a set of images in the plurality of source video images. For example, the video format controller (104) may determine that a portion of a display that is used to display this set of images should be set aside for displaying statistic information about a baseball player who appears in the plurality of source video images (124). To produce graphics effects as described herein, the video format controller (104) may sent a second control signal (150) to the graphics overlayer (154) specifying what type of graphics effects should be created for which set of images in the plurality of images.

The graphics overlayer (154) may, immediately or at a time or a frame as specified by the video format controller (104), generate graphics effects image data (152). The graphics overlayer (154) sends the graphics effects image data (152) to a composite renderer (146).

In an embodiment, the composite renderer (146) generally represents any hardware and/or software configured for combining/converting images (130) from the video format filters (108) with the graphics effects image data (152) from the graphics overlayer (154) into new images (148) that include graphic effects which may be properly rendered by the display unit (110) in a display mode as indicated by the display mode information (128).

In an embodiment, the composite renderer (146) may receive input from multiple sources. The composite renderer (146) may combine multiple images for concurrently displaying the multiple images. For example, the composite renderer (146) may combine images by overlaying one image on top of another image. The composite renderer (146) may overlay images where at least a portion of each image is visible. For example, the composite renderer (146) may receive a modified image in side-by-side format from the video format filters (108), where the video format filters (108) generated the side-by-side image from the original image that was not in a side-by-side format. The composite renderer (146) may then overlay this modified image in side-by-side format on top of an image from a 3D video source that was pre-encoded for the 3D display mode in the side-by-side format. The composite renderer (146) may include the functionality to overlay the two side-by-side format images with or without transparency where the image on the bottom is visible or not visible through the top image, respectively. Accordingly, the composite renderer (146) may receive and effectively combine a first image pre-encoded for the 3D display mode with another image (not previously encoded), which was encoded for the 3D display mode by the video format filters (108).

In an embodiment, the composite renderer (146) may receive a side-by-side image where each side is made up of different color layers. The composite renderer (146) may superimpose one half of a side-by-side image onto the other half of a side-by-side image to generate an anaglyph image and provide a stereoscopic 3D effect on the display unit (110) when viewed with 2 color glasses with chromatically opposite colors.

In an embodiment, the composite renderer (146) may provide a set of frames intended for the left eye and a set of frames intended for the right eye in an alternating sequence for display in the display unit (110). The alternating frames may be viewed with LCD shutter glasses which alter viewing of the display unit (110) between the left eye and the right eye at the same rate at which the frames are refreshed. As a result, a viewer's eyes alternate in watching respective frames on the display unit (110).

6. Other Example Multi-View Display Systems

Figure 1E:
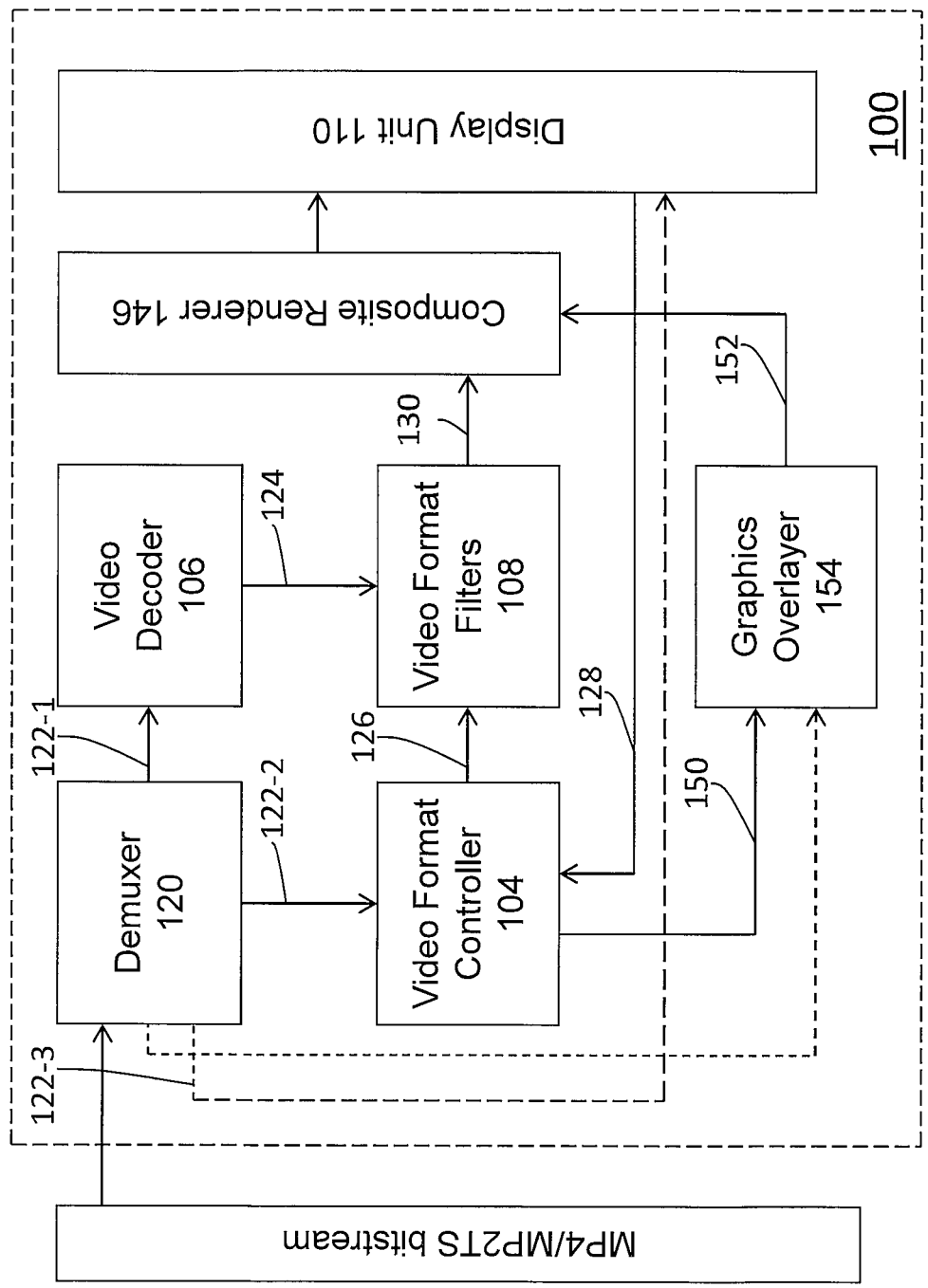

FIG. 1E illustrates another example multi-view display system (e.g., 100), according to embodiments of the invention. The multi-view display system (100) comprises a demuxer (e.g., 120) that accepts various media data such as MP4, MP2TS, etc. and that provides outputs to the multi-view display system (100) in multiple data flows. The multiple data flows may include the aforementioned data flows (122-1 and 122-2) and separate data flows for audio (122-3) and for graphics effects (150). The multi-view display system (100) includes a display unit (e.g., 110).

7. Example Sequence of Filtering

Figure 2:
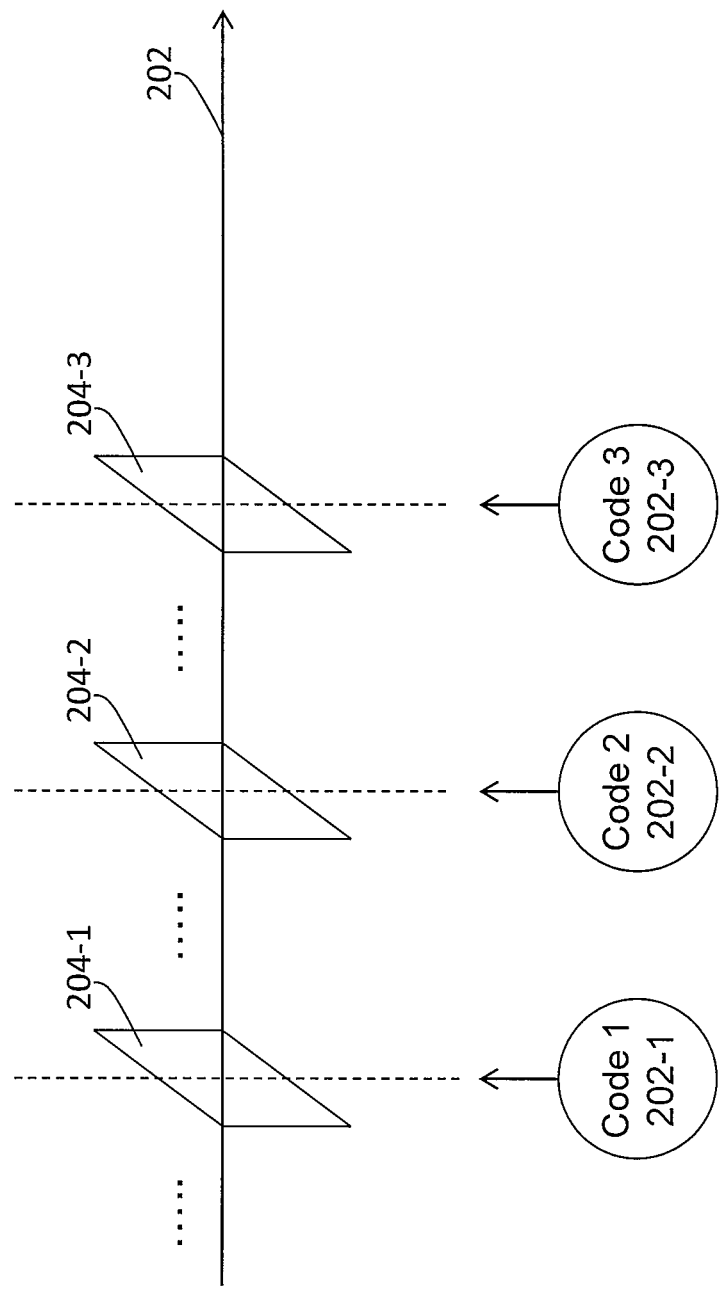
FIG. 2 illustrates example embodiments for applying video format filters to sets of source video images, according to possible embodiments of the present invention.

FIG. 2 illustrates example operations for applying video format filters to sets of source video images. In an embodiment, a video format controller (e.g., 104) in a multi-view display system (e.g., 100) extracts one or more video format codes from an input (e.g., 122-2) that may be a coded bitstream or a part thereof.

As discussed above, the video format codes may be embedded in the coded bitstream comprising image data and metadata from one or more sources. For example, image data and metadata and/or video format codes may be downloaded from the internet, received from a media content player, may be text or graphics read from a file, may be submitted by a user, may be received as an interface from a television, media content player or other device, may be media content received from a cable broadcaster or satellite dish, may be received from a gaming interface, may be input from a camera, or may be received from any other suitable source. Push and/or pull capabilities may be required for a multi-view display system receiving the data as described herein.

In an embodiment, a video decoder (e.g., 106) of the multi-view display system decodes the image data received into a plurality of source video images (124) along a media time direction (202). The plurality of source video images (124) may be encoded in two or more source video formats. For example, the plurality of source video images (124) may comprise a first set of source video images (204-1) encoded in a first source video format, a second set of source video images (204-1) encoded in a second source video format, a third set of source video images (204-3) encoded in a third source video format, etc.

In an embodiment, the video format controller maps the extracted video format codes to source video formats in which one or more sets of source video images in the plurality of source video images (124) are encoded. For example, the extracted video format codes may comprise a first video format code (Code 1 202-1), a second video format code (Code 2 202-1), a third video format code (Code 3 202-1), etc. The video format controller may determine that the first video format code (202-1) indicates that the video format for the first set of source video images (204-1) is the first source video format. The video format controller may also determine that the second video format code (202-2) indicates that the video format for the second set of source video images (204-2) is the second source video format and that the third video format code (202-3) indicates that the video format for the third set of source video images (204-3).

For example, images relating to a 3D movie from a 3D movie player may be encoded in a 3D video format. Images relating to a menu screen from the 3D movie player, on the other hand, may be encoded in a 2D video format. In an embodiment, a lookup table as described herein may be accessed by the video format controller (104) for mapping a video format code to a video format. In another example, images from a 3D programming channel may be encoded in a 3D video format. Images from a 2D commercial, on the other hand, may be encoded in a 2D video format. In an embodiment, the images from the 2D commercial may be graphically overlaid with the images from the 3D programming channel to appear simultaneously on the same display panel.

In an embodiment, video format filters (108) in the multi-view display system (100) may comprise a plurality of video format filters. A video format filter in the video format filters (108) may be selected based on a video format code extracted from the coded bitstream. For example, if the first set of source video images is not encoded for a display video format as indicated by display mode information (128), then the first set of source video images is modified by the video format filter to obtain another set of converted images that is encoded for the display video format. If the second set of source video images is encoded in the display video format as indicated by display mode information (128), then a null filter may be selected from the plurality of video format filters. When the null filter is used, the second set of source video images may not be modified. If the third set of source video images is not encoded for the display video format as indicated by display mode information (128), then the third set of source video images is modified by a suitable video format filter to obtain a second other set of converted images that is encoded for the display video format.

8. Example Filtering Operations

Figure 3:
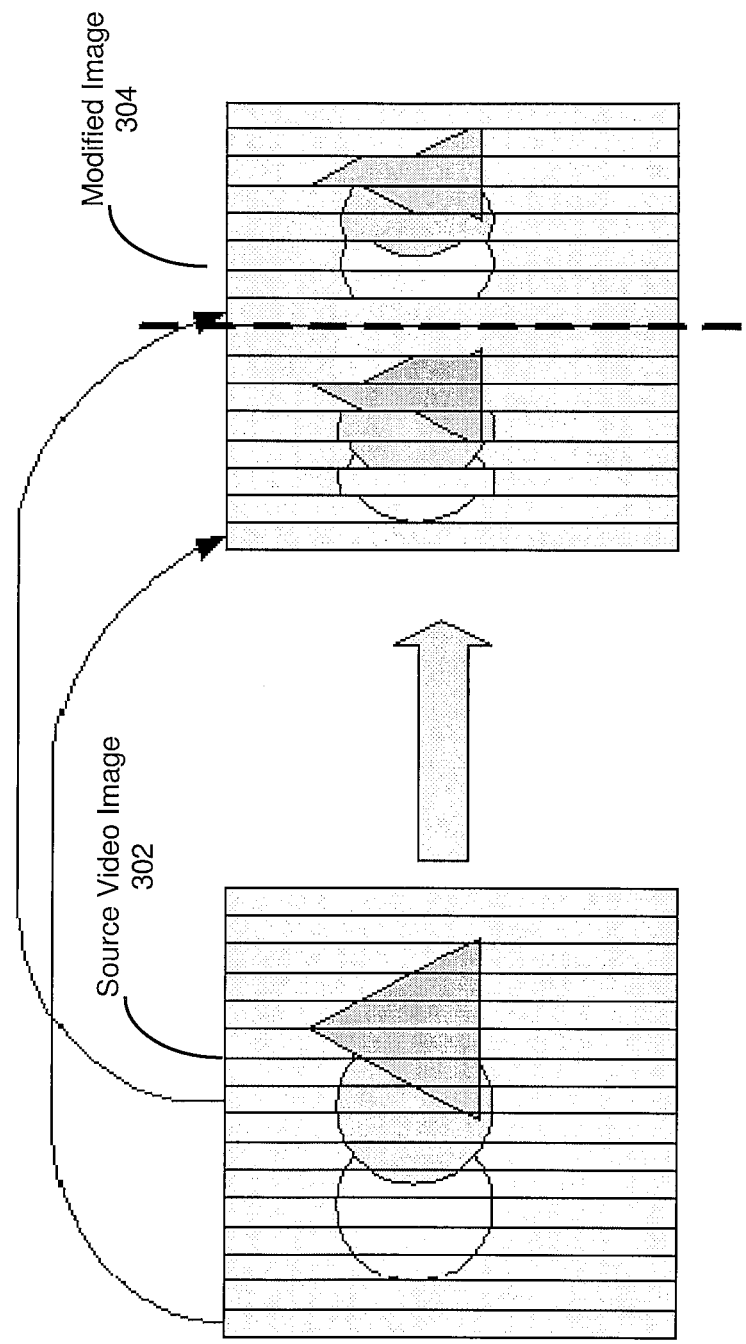
FIG. 3 illustrates example filtering operations, according to possible embodiments of the present invention.

Modification of a source video image by a video format filter as described herein may involve removing pixels, adding pixels, modifying pixels, or rearranging pixels of the input image. For example, in a source video image with a side-by-side 3D source video format, columns or rows within the source video image may be rearranged to obtain the modified image. For example, as shown in FIG. 3, all of the odd columns of the source video image (302) are used to generate the left half of the modified image (304) and all of the even columns of the source video image (302) are used to generate the right half of the modified image (304). Wide columns are used in this example for illustrative purposes, however, any size columns may be used to implement this method. For example, each column width may be the width of a single pixel in the source video image. In an embodiment, the columns may be used with spaces in between the columns.

Displaying images in the display video format as indicated by display mode information (128) may involve special equipment as described above. In one or more embodiments, the resulting visualization for a viewer is a 3D illusion created using multiple 2D views. For example, the left image of a side-by-side image perceived by the left eye and the right image of a side-by-side image perceived by the right eye are fused to create an illusion of a three dimensional scene by the visual cortex of the brain. The illusion of the three dimensional scene may also be referred to as an integrated stereoscopic image.

9. Example Process Flow

FIG. 4 illustrates an example process flow according to a possible embodiment of the present invention. In some possible embodiments, one or more computing devices or components in a multi-view display system (100) may perform this process flow. In block 410, the multi-view display system (100) determining a display video format supported by a display panel (e.g., in a display unit (110)). In block 420, the multi-view display system (100), or a video format controller (104) therein, extracts a video format code (e.g., 202-1) from a coded bitstream. The coded bitstream also comprises image data that may be decoded by a video decoder (106), giving rise to a plurality of images (124) encoded in two or more source video formats. The video format code extracted from the coded bitstream identifies a source video format in which a set of images (e.g., 204-1) in the plurality of images (124) is encoded.

This process may be repeated so that the plurality of images in the coded bitstream is converted as needed to generate images encoded in a video format that may be correctly presented in the display mode of the display panel.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
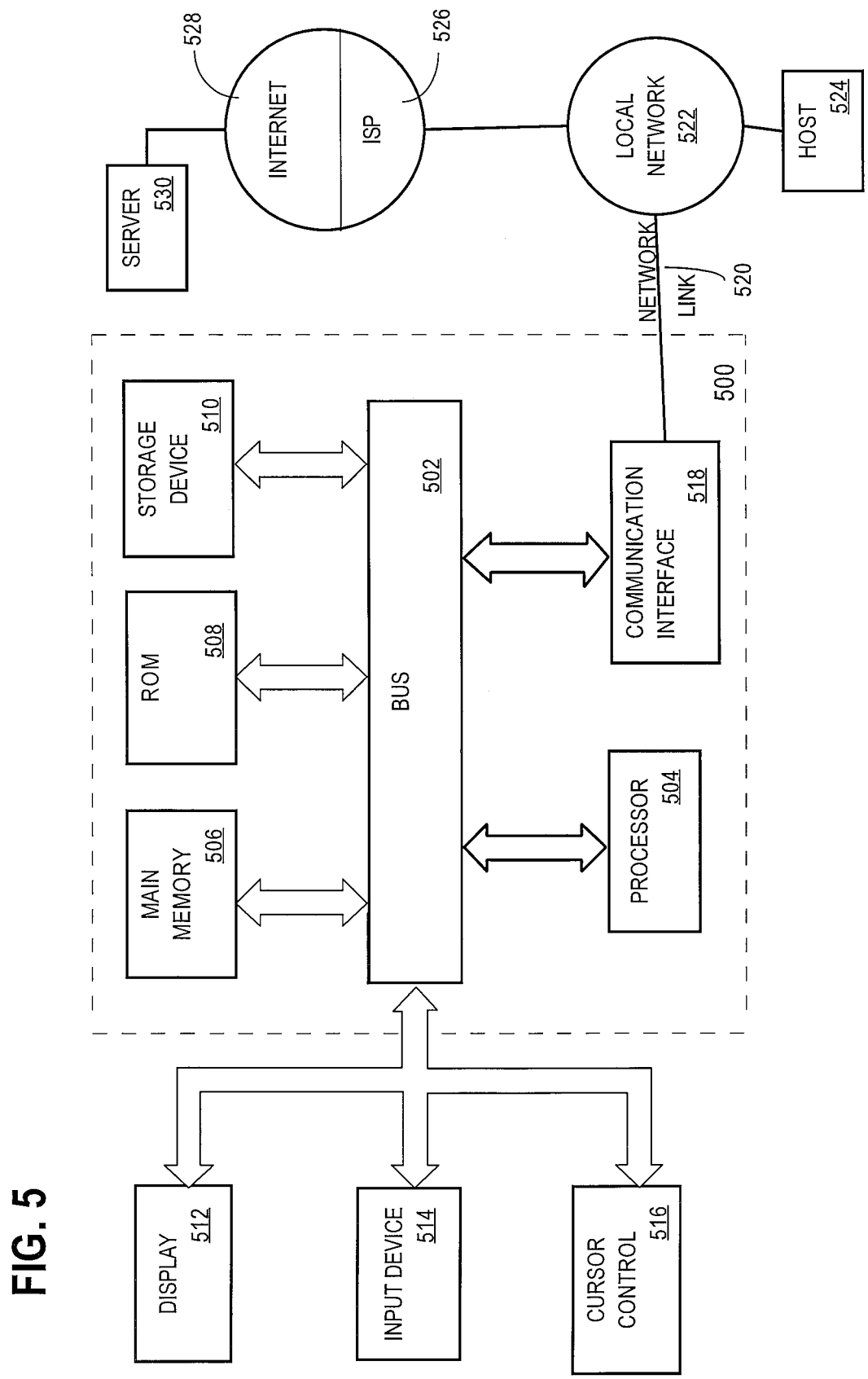
FIG. 5 illustrates an example hardware platform on which a computer or a computing device as described herein may be implemented, according a possible embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

11. Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   determining a display video format supported by a display panel;
   subsequent to determining the display video format, performing:
   extracting two or more video format codes from a coded bitstream, the coded bitstream comprising image data for a plurality of images encoded in two or more source video formats, and each video format code of the video format codes identifying a respective source video format, of the two or more source video formats, in which a respective set of images in the plurality of images is encoded;
   selecting, based on the two or more video format codes, two or more video format filters to convert the plurality of images encoded in the two or more source video formats in the coded bitstream to a plurality of converted images encoded in the display video format, each video format filter of the two or more video format filters (a) corresponding to a respective video format code that identifies a source video format of the two or more source video formats and (b) being selected to modify a respective set of images encoded in the source video format, in the plurality of images in the coded bitstream, to generate a respective set of converted images in the plurality of converted images encoded in the display video format;
   applying a first video format filter in the two or more video format filters to perform first image conversion operations on one or more first images, encoded in a first source video format of the two or more source video formats among the plurality of images in the coded bitstream, to one or more first converted images in the plurality of converted images encoded in the display video format;
   applying a second different video format filter in the two or more video format filters to perform second different image conversion operations on one or more second different images, encoded in a second different source video format of the two or more source video formats among the plurality of images in the coded bitstream, to one or more second converted images in the plurality of converted images encoded in the display video format;
   sending the plurality of converted images encoded in the display video format to the display panel; wherein the method is performed by one or more devices comprising a computer processor.

2. The method of claim 1, wherein the display video format is one of two or more display video formats supported by the display panel.

3. The method of claim 1, wherein at least one of the video format codes is indicated in a metadata channel in the coded bitstream and is outside one or more media data channels that encode the plurality of images.

4. The method of claim 1, wherein the coded bitstream is a container file that comprises one or more channels that encode the plurality of images and a separate channel that comprises at least one of the video format codes.

5. The method of claim 1, wherein the coded bitstream is a Moving-Picture-Experts-Group 4 (MP4) file and wherein at least one of the video format codes is embedded in one or more MP4 metadata tracks that are separate from tracks that encode the plurality of images.

6. The method of claim 1, wherein the coded bitstream is a Moving-Picture-Experts-Groups 2 transport stream (MP2TS) and wherein at least one of the video format codes is embedded in one or more tracks that comprise packet identifiers (PIDs) and that are separate from one or more media data tracks that encode the plurality of images.

7. The method of claim 1, wherein the coded bitstream is a H.264 video elementary stream and wherein at least one of the video format codes is embedded in one or more Supplemental Enhancement Information (SEI) messages.

8. The method of claim 1, wherein a set of images corresponding to at least one of the video format codes are 3D images that contain depth information.

9. The method of claim 1, wherein a set of images corresponding to at least one of the video format codes are 2D images.

10. The method of claim 1, wherein the display video format relates to a 3D video display mode of the display panel.

11. The method of claim 1, wherein the display video format relates to a 2D video display mode of the display panel.

12. The method of claim 1, further comprising extracting a timestamp embedded in the coded bitstream, the timestamp specifying a time at which a set of images corresponding to one of the video format codes starts.

13. An apparatus, comprising:
   a plurality of video format filters; and
   a video format controller, configured to perform:
   determining a display video format supported by a display panel;
   subsequent to determining the display video format, performing:
   extracting two or more video format codes from a coded bitstream, the coded
   bitstream comprising image data for a plurality of images encoded in two or more source video formats, and each video format code of the video format codes identifying a respective source video format, of the two or more source video
   formats, in which a respective set of images in the plurality of images is encoded;

selecting, based on the two or more video format codes, two or more video format filters to convert the plurality of images encoded in the two or more source video formats in the coded bitstream to a plurality of converted images encoded in the display video format, each video format filter of the two or more video format filters (a) corresponding to a respective video format code that identifies a source video format of the two or more source video formats and (b) being selected to modify a respective set of images encoded in the source video format, in the plurality of images in the coded bitstream, to generate a respective set of converted images in the plurality of converted images encoded in the display video format;

applying a first video format filter in the two or more video format filters to perform first image conversion operations on one or more first images, encoded in a first source video format of the two or more source video formats among the plurality of images in the coded bitstream, to one or more first converted images in the plurality of converted images encoded in the display video format;

applying a second different video format filter in the two or more video format filters to perform second different image conversion operations on one or more second different images, encoded in a second different source video format of the two or more source video formats among the plurality of images in the coded bitstream, to one or more second converted images in the plurality of converted images encoded in the display video format;

sending the plurality of converted images encoded in the display video format to the display panel.

14. The apparatus of claim 13, wherein the display video format is one of two or more display video formats supported by the display panel.

15. The apparatus of claim 13, wherein at least one of the video format codes is indicated in a metadata channel in the coded bitstream and is outside one or more media data channels that encode the plurality of images.

16. The apparatus of claim 13, wherein the coded bitstream is a container file that comprises one or more channels that encode the plurality of images and a separate channel that comprises at least one of the video format codes.

17. A non-transitory computer readable storage medium, comprising software instructions, which when executed by one or more processors cause performance of:

determining a display video format supported by a display panel;

subsequent to determining the display video format, performing:

extracting two or more video format codes from a coded bitstream, the coded bitstream comprising image data for a plurality of images encoded in two or more source video formats, and each video format code of the video format codes identifying a respective source video format, of the two or more source video formats, in which a respective set of images in the plurality of images is encoded;

selecting, based on the two or more video format codes, two or more video format filters to convert the plurality of images encoded in the two or more source video formats in the coded bitstream to a plurality of converted images encoded in the display video format, each video format filter of the two or more video format filters (a) corresponding to a respective video format code that identifies a source video format of the two or more source video formats and (b) being selected to modify a respective set of images encoded in the source video format, in the plurality of images in the coded bitstream, to generate a respective set of converted images in the plurality of converted images encoded in the display video format;

applying a first video format filter in the two or more video format filters to perform first image conversion operations on one or more first images, encoded in a first source video format of the two or more source video formats among the plurality of images in the coded bitstream, to one or more first converted images in the plurality of converted images encoded in the display video format;

applying a second different video format filter in the two or more video format filters to perform second different image conversion operations on one or more second different images, encoded in a second different source video format of the two or more source video formats among the plurality of images in the coded bitstream, to one or more second converted images in the plurality of converted images encoded in the display video format;

sending the plurality of converted images encoded in the display video format to the display panel.

18. The medium of claim 17, wherein the display video format is one of two or more display video formats supported by the display panel.

19. The medium of claim 17, wherein at least one of the video format codes is indicated in a metadata channel in the coded bitstream and is outside one or more media data channels that encode the plurality of images.

20. The medium of claim 17, wherein the coded bitstream is a container file that comprises one or more channels that encode the plurality of images and a separate channel that comprises at least one of the video format codes.

* * * * *